United States Patent [19]

Bones et al.

[11] Patent Number: 4,774,156
[45] Date of Patent: Sep. 27, 1988

[54] ELECTROCHEMICAL CELL

[75] Inventors: Roger J. Bones, Abingdon; Derrick J. Baker, Newbury, both of England; Johan Coetzer, Pretoria, South Africa

[73] Assignee: Lilliwyte Societe Anonyme, Rue Des Girondins, Luxembourg

[21] Appl. No.: 57,423

[22] Filed: Jun. 2, 1987

[30] Foreign Application Priority Data

Jun. 6, 1986 [GB] United Kingdom ............... 8613796

[51] Int. Cl.$^4$ .......................................... H01M 10/39
[52] U.S. Cl. ..................... 429/103; 429/104
[58] Field of Search .................. 429/102, 103, 104, 50

[56] References Cited

U.S. PATENT DOCUMENTS

| | | |
|---|---|---|
| 3,922,176 | 11/1975 | Robinson et al. |
| 4,006,281 | 2/1977 | Markin et al. ............ 429/101 |
| 4,044,191 | 8/1977 | Evans et al. ............ 429/104 |
| 4,529,676 | 7/1985 | Galloway et al. |
| 4,546,055 | 10/1985 | Coetzer et al. |
| 4,560,627 | 12/1985 | Bones et al. ............ 429/103 |
| 4,592,969 | 6/1986 | Coetzer et al. |
| 4,626,483 | 12/1986 | Bones et al. |

FOREIGN PATENT DOCUMENTS

| | | |
|---|---|---|
| 0053889 | 6/1982 | European Pat. Off. |
| 9111128 | 2/1973 | Japan ...................... 429/104 |
| 1491929 | 11/1977 | United Kingdom. |
| 1500867 | 2/1978 | United Kingdom. |
| 1505950 | 4/1978 | United Kingdom. |
| 1558241 | 12/1979 | United Kingdom. |
| 2164786A | 3/1986 | United Kingdom. |
| 2182194A | 5/1987 | United Kingdom. |

Primary Examiner—Donald L. Walton
Attorney, Agent, or Firm—Arnold, White & Durkee

[57] ABSTRACT

The invention provides a rechargeable electrochemical cell comprising a cell housing 10 divided by a separator 20 into a pair of electrode compartments, one of which contains an anode substance and the other of which contains an active cathode substance and an electrolyte. The anode and electrolyte are liquid at the operating temperature of the cell and the electrode compartments are each divided into a gas chamber communicating with an electrode chamber. The gas chamber contains an inert gas under pressure and the electrode chamber contains a liquid, namely the anode material or the liquid electrolyte. A wall of each electrode chamber is provided by the separator and each electrode chamber has a closeable bleed outlet 74, 80. The cell has an operative attitude in which said bleed outlets can be used to bleed gas from the associated electrode chambers, and each electrode chamber is in communication with the associated gas chamber, such that the cell in its operative attitude has each electrode chamber completely full of liquid, and each gas chamber containing inert gas under pressure and liquid.

8 Claims, 1 Drawing Sheet

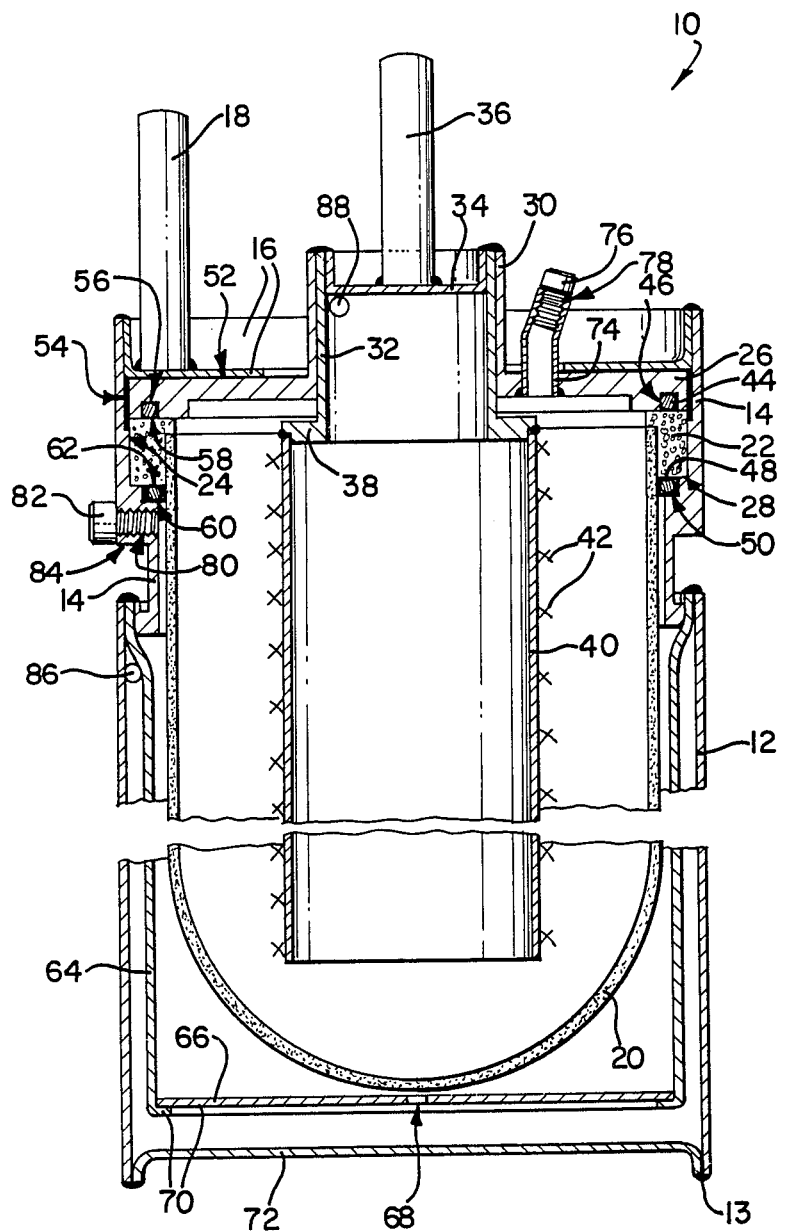

ELECTROCHEMICAL CELL

This invention relates to a rechargeable high temperature electrochemical power storage cell, and to a method of loading such cell. More particularly, it relates to such a cell of the type comprising a liquid anode substance and an active cathode substance in contact with a liquid electrolyte, the anode substance and liquid electrolyte being separated by a separator which is permeable to the anode substance in ionic form.

According to the invention there is provided a rechargeable high temperature electrochemical power storage cell which comprises a cell housing divided by a separator into a pair of electrode compartments, one of which contains an anode substance and the other of which contains an active cathode substance and an electrolyte, said anode substance and electrolyte being liquid at the operating temperature of the cell, the separator separating the anode substance from the electrolyte and permitting anode substance to pass from the anode compartment into the cathode compartment in ionic form, at least one of the compartments being divided into two communicating chambers, namely a gas chamber which contains an inert gas and an electrode chamber which contains a liquid at the operating temperature of the cell, a wall of the electrode chamber being provided by the separator and the electrode chamber having a closable outlet to the exterior of the cell, the cell having an operative attitude in which each closable outlet emerges from the associated electrode chamber at a level which permits any gas under pressure above a liquid in said chamber to be bled from said chamber, and in which operative attitude the communication between each electrode chamber and the associated gas chamber is at a level spaced below the top of said associated gas chamber, the cell in all states of charge in said attitude and at its operating temperature containing sufficient liquid in each divided electrode compartment fully to wet the adjacent side of that part of the separator which separates the electrode compartments from each other, each gas chamber in all states of charge of the cell and at said operating temperature containing, in addition to the inert gas, liquid above the level of its communication with the associated electrode chamber and containing said inert gas at a pressure and in a volume sufficient to accommodate changes in level of liquid in each divided electrode compartment associated with charging and discharging the cell.

In use, each closeable outlet from a gas chamber will form a bleed outlet for bleeding gas therefrom. The cell will be orientable into its operative attitude such that each closeable bleed outlet or opening emerges from its associated electrode chamber at a level at or above that part of the separator which separates the electrode compartment from each other. As will emerge hereunder, this is to permit bleeding of trapped gases adjacent the separator out of the cell, to render substantially the whole of the separator useful for transport of anode material.

One of the electrode compartments will be an anode compartment, the other being a cathode compartment. Typically the active anode substance comprises a molten alkali metal such as sodium, the liquid electrolyte also being molten, comprising eg an alkali metal aluminum halide. In this case there is a movement of anode substance ions such as sodium ions through the separator from the anode compartment into the cathode compartment during discharging, with an associated decrease in liquid level in the anode compartment and increase in liquid level in the cathode compartment; and, upon charging, a movement of sodium ions in the opposite direction through the separator, with changes in liquid level in the opposite sense in said compartments.

Both electrode compartments may each be divided into a said electrode chamber and a said gas chamber, the cell having a base for supporting the cell in said operative attitude on a flat horizontal support surface.

In a particular embodiment of the cell the anode is molten sodium and the cathode is in the form of an electronically conductive electrolyte-permeable matrix impregnated with liquid electrolyte, the liquid electrolyte being sodium aluminum halide (eg chloride) molten salt electrolyte and the separator being a solid conductor of sodium ions such as beta alumina or nasicon, or a micromolecular sieve which contains sodium sorbed therein. In this embodiment the matrix may be formed from at least one member of the group comprising Fe, Ni, Co, Cr and Mn and the intermediate refractory hard metal compounds of said transition metals with at least one non-metal of the group comprising carbon, silicon, boron, nitrogen and phosphorous.

With regard to the solid conductor of sodium ions or micromolecular sieve, this separates the anode compartment from the cathode compartment so that any active anode substance such as sodium moving from the anode to the electrolyte, or vice versa, has a pass through the internal crystal structure of the solid conductor or through the microporous interior of the micromolecular sieve, as the case may be, passing in atomic form through the interface between the anode and separator and passing in ionic form through the interface between the electrolyte and separator.

By "micromolecular sieve" is meant a molecular sieve having interconnected cavities and/or channels in its interior and windows and/or pores in its surface leading to said cavities and channels, the windows, pores, cavities and/or channels having a size of not more than 50 Angstrom units and preferably less than 20 Angstrom units. Such sieves include mineral micromolecular sieves such as the tectosilicates, examples of which are zeolites 13X, 3A and 4A.

For this type of cell the separator is typically tubular in shape and closed at one end, the cell having its outer housing or casing arranged concentrically around the tube with the tube substantially vertical closed end of the tube in use lowermost, one electrode compartment being provided in the interior of the tube and the other being provided between the tube and the casing. The anode can be in the tube with the cathode outside the tube, or vice versa. In this type of cell it is desirable to have both electrode compartments divided into a gas chamber and an electrode chamber as described above. Accordingly, in a particular embodiment of the invention the separator may be a straight tube having an open end and a closed end, the cell having a sealed outer casing surrounding the tube and spaced therefrom to provide a space between the tube and the casing which defines one of the electrode compartments, the open end of the tube having a sealed closure and the interior of the tube defining the other of the electrode compartments, and the tube and casing being arranged so that in the operative attitude of the cell the tube extends substantially vertically with its closed end lowermost.

Although having both electrode compartments each divided into a gas chamber and electrode chamber is emphasized herein, it will be appreciated that advantages can be obtained, if only one, and indeed either, electrode compartment is divided into a gas chamber and electrode chamber, and the invention contemplates this possibility. In the type of cell in question having a molten sodium anode, the volume of the molten sodium anode will decrease during discharging, while the level of the liquid electrolyte increases correspondingly, and, during charging, the volume of the anode increases while the level of the electrolyte decreases. This change in volume or level is compensated for by changes in volume in the inert gas in the two gas chambers while the two electrode chambers are kept substantially full of liquid (molten anode substance such as sodium and liquid electrolyte respectively) at all times, so that opposite sides of the separator exposed respectively to the anode the cathode chambers are fully wetted by liquid at all times. This allows the full available area of the separator to be functionally employed for ionic transport during all stages of charging and discharging, keeping the overall internal resistance of the cell provided by the separator to its minimum at all times.

In a particular construction, the electrode compartment defined by the interior of the tube may have a tubular partition extending along its interior, the tubular partition having one end thereof sealed to the sealed closure of the tube and its other end open and spaced from and facing the closed end of the tube, the interior of the partition defining the gas chamber of said electrode compartment, the interior of the tube outside the partition defining the electrode chamber of said compartment, said chambers communicating via the open end of the partition and the closable outlet for the electrode chamber being provided in the tube closure. In turn, the electrode compartment defined by the space between the tube and the casing may have a tubular partition extending along its interior and spaced from both the casing and the tube, the tubular partition having its end closest to the open end of the tube sealed to the casing and its other end open, the space between the tubular partition and the tube defining the electrode chamber of said compartment, and the space between the tubular partition and the casing defining the gas chamber of said electrode compartment.

As mentioned above, as regards the electrochemistry of the cell, the anode substance is preferably an alkali metal, the electrolyte being a metal halide, and the separator being a solid conductor of alkali metal ions of the anode or a micromolecular sieve which contains the alkali metal of the anode sorbed therein. Preferably the alkali metal of the anode is sodium, the electrolyte being a sodium aluminum halide, the separator being beta"-alumina, and the active cathode substance comprising at least one transition metal selected from the group comprising Fe, Ni, Co, Cr, and Mn. The cathode may be in the form of a porous matrix impregnated with the electrolyte, the molar proportion of alkali metal cations in the electrolyte being at all stages of charge of the cell, no less than the molar proportion of aluminum cations therein. When the electrolyte is a sodium aluminum chloride, this can be ensured by loading the cathode compartment with sufficient sodium chloride, so that solid sodium chloride is present and in contact with the liquid electrolyte during all stages of charge. This sodium chloride in solid form should be present at least in all stages of discharge, other than the fully charged state of the cell.

The invention also provides a method of loading a cell as described above, the method comprising loading an active cathode substance and an electrolyte into one of the electrode compartments, orienting the cell into its operative attitude, and at least partially filling each gas chamber with an inert gas, the amounts of said active cathode substance, electrolyte and inert gas loaded into the cell being selected so that heating the cell to its operating temperature and cycling the cell causes each gas chamber to contain inert gas under pressure and a liquid, and causes, after bleeding any gas present in each electrode chamber therefrom via the associated closable outlet, the electrode compartments to contain sufficient liquid fully to wet both sides of that part of the separator which separates the electrode compartments from each other.

As mentioned above, preferably both the electrode compartments are each divided respectively into a gas chamber and an electrode chamber and the volume of active cathode substance and electrolyte charged into the cathode compartment is greater than the volume of the cathode chamber of the cathode compartment, when the cell is in its charged state. Optionally, anode substance can simultaneously be loaded into the other electrode compartment, i.e. the anode compartment, its volume being selected so that with the cell in its discharged state, the volume of anode substance is greater than the volume of the anode chamber of the anode compartment. In both the electrode compartments the gas chambers will contain inert gas, one electrode compartment containing the cathode and liquid electrolyte, and the other electrode compartment optionally containing anode substance. Further steps in cell assembly will depend on the state of charge of the cathode substance when it is loaded.

If the cathode substance is loaded fully charged, then sufficient anode substance should initially be charged into the anode compartment to cover and wet the entire surface of the separator exposed to the anode compartment after the cell is discharged. If the cathode substance is loaded overdischarged, then no anode substance need be loaded into the anode compartment, but the volume of active cathode substance and the volume of the anode chamber of the anode compartment should be selected so that charging of the cell from its overdischarged state to its discharged state transports a volume of anode substance through the separator into the anode compartment which is greater than the volume of the anode chamber. If the cathode substance is loaded in an intermediate state of charge an intermediate amount of anode substance may be loaded into the anode compartment, again selected so that when the cell is fully discharged, there will be a volume of anode substance in the anode compartment greater than the volume of the anode chamber.

After loading the inert gas in the gas chambers should be pressurised. As the cells of the invention are high temperature cells, this can automatically take place when they are raised to their operating temperature. The cells should then be put through at least one charge/discharge cycle.

If the cathode substance is loaded in a discharged state, the first half cycle will be a charge cycle and at the end of this charge cycle the bleed opening of the anode chamber is opened and any inert gas therein is bled out to ensure that the level of anode substance rises in the anode chamber until the surface of the separator exposed to the anode chamber is fully wetted by anode substance and said chamber is substantially fully filled with anode substance. The bleed opening is then closed. The cell is then discharged and at the end of the discharge cycle the bleed opening of the cathode chamber is opened and any inert gas therein is bled out until the cathode chamber is substantially fully filled with liquid electrolyte and the surface of the separator exposed to the cathode chamber is completely wetted by liquid electrolyte. If the cathode is initially overdischarged the anode compartment can be empty of anode substance at the start of the first charge cycle, or it can contain a starting amount of anode substance, and the anode chamber should be bled when the cell has been charged from its overdischarged state to its discharged state. Naturally, if desired, both chambers may also be bled of inert gas before the start of the first charge cycle if inert gas in the gas chambers has been pressurized by heating to the cell operating temperature, and both the anode chamber and cathode chamber may be bled again after subsequent charge and discharge cycles respectively, to ensure that there is no build-up of gas therein and to ensure that the full available area of the separator remains available for use.

When the cathode substance is loaded fully charged, anode substance will also be loaded, and the first half cycle will be a discharge cycle. The cathode chamber can be bled at the end of this discharge cycle and the anode chamber can be bled at the end of the next charge half cycle, with subsequent bleedings if desired. When the cathode substance is loaded partially charged, it can be initially charged or discharged as desired, the anode chamber (which will be loaded with a partial charge of anode substance) being bled after the first one or two charge cycles and after later charge cycles, if desired, and the cathode chamber being bled after the first one or two discharge cycles and after later discharge cycles, if desired.

It should be noted, in particular, that when the cell is loaded with an overdischarged cathode substance and no anode substance is loaded, the above described procedure has the advantage that reactive anode substances need not be handled. It should also be noted that, although the above procedure has been described for both electrode compartments, it can naturally be carried out for one only, i.e. when the cell has only one electrode compartment divided into a gas chamber and electrode chamber, that chamber being bled of gas after the initial half cycle which tends to fill it with liquid, and later, if desired. It is also in principle possible to bleed the anode chamber during a charge cycle, and to bleed the cathode chamber during a discharge cycle, instead of or in addition to bleeding at the end of said cycles, the bleed opening being closed when all the gas has been bled from the chamber in question.

The invention will now be described, by way of example, with reference to the accompanying diagrammatic drawing in which the single FIGURE shows a sectional side elevation of the housing of a high temperature rechargeable electrochemical cell in accordance with the present invention.

In the drawing the cell housing is generally designated by reference numeral 10 and is shown broken midway along its length, typically having an outside diameter of about 50–60 mm and a length of about 30–60 cm. The housing shown is for a cell having a molten sodium anode material, a sodium aluminum chloride liquid electrolyte and an active cathode substance which in its discharged state comprises an electrolyte-permeable porous matrix containing $FeCl_2$, $NiCl_2$ or $FeCl_2/NiCl_2$ dispersed therein and saturated with said electrolyte, the matrix having sufficient finely divided NaCl dispersed therein to ensure that, in all states of charge of the cathode substance, the electrolyte is an equimolar mix of NaCl and Al Cl$_3$, i.e. NaAl Cl$_4$.

The cell housing 10 comprises a mild steel outer casing 12 having a base in the form of a rim 13 for supporting it in an operative upright attitude on a horizontal support surface (not shown). The casing 12 is attached by welding to a mild steel casing seat 14 at the top of the casing 12. The seat 14 is closed off by an annular stainless steel or aluminum top casing cap 16 welded thereto. The cap 16 has a stainless steel or aluminum, as the case may be, cell terminal post 18 welded thereto. An open-ended beta"-alumina separator tube 20 is located concentrically within the casing 12, the upper open end of the tube 20 being glass welded to an alpha alumina ring 22 which ring seats with a sliding fit at 24 against an inner curved surface provided therefor on the seat 14.

The tube 20 is closed off by a mild steel closure member 26. This closure member 26 clamps the ring 22 against a shoulder 28 on the seat 14 and the closure member 26 is in turn clamped in position by the cap 16. The closure member 26 has an upstanding central socket 30 therethrough, within which is welded a stainless steel or aluminum tubular spigot 32. This spigot is closed off by a stainless steel or aluminum panel 34 which carries an upwardly projecting stainless steel or aluminum cell terminal post 36. The lower end of the spigot 32 projects below the level of member 26, and has a radially outwardly projecting circumferential flange 38 to which a mild steel inner tube 40 is welded. The tube 40 has a nickel mesh 42 wrapped tightly around its outer surface.

The member 26 is sealed to the ring 22 by a nickel O-ring seal 44 located in a circumferential groove 46 in the lower face of the member 26, and the ring 22 is in turn sealed to the seat 14 by a nickel O-ring 48 located in a rebate defined by an annular shoulder 50 in the seat 14 adjacent the shoulder 28. The cap 16 is electronically insulated from the member 26 by an annular mica disc 52, and the member 26 is electronically insulated from the seat 14 by a mica ring 54. The nickel O-ring 44 seats in the groove 46 on the member 26 via an annular grafoil (graphite) disc 56 and on the ring 22 via an annular aluminum disc 58, the O-ring 48 similarly seating on the shoulder 50 via an annular grafoil disc 60 and on the ring 22 via an annular aluminum disc 62.

A mild steel inner casing 64, welded to the casing 12 and seat 14, is located concentrically around the tube 20 and within the casing 12, separated respectively therefrom by annular spaces. The lower end of the casing 64 is closed by a panel 66 of aluminum having a central opening 68 therethrough, the panel 66 resting on a radially inwardly projecting circumferential flange 70 at the lower end of the casing 64. The opening 68 functions to restrict flow between the annular spaces, e.g. in the event of cell damage. A mild steel floor panel 72 is welded to and closes off the lower end of the casing 12.

The socket 30 projects upwardly through the central opening of the cap 16 and, alongside said socket, there is a bleed outlet or opening provided by a mild steel tube 74 welded into a bore in the member 26. The tube 74 has an internally tapped outer end provided with a closure screw 76 and a gold sealing ring 78. A bleed outlet or opening through the seat 14 is provided by a tapped passage 80 through the seat 14 immediately below the shoulder 50. This passage 80 has a tapped outer end provided with closure screw 82 and is provided with an aluminum sealing ring 84. The passage 80 leads into the top of an annular space between the tube 20 and seat 14, which forms an upward extension of the annular space between the tube 20 and casing 64.

The housing 10 is intended to be for a cell of the so-called inside-cathode type, so that the porous cathode matrix (not shown) will be formed on the outer surface of the tube 40, the mesh 42 being embedded in this matrix and the mesh 42 and tube 40 acting as the cathode current collector. The casings 12 and 64 will in turn act as the anode current collector.

In this regard it will be noted that the tube 20 divides the housing 10 into an inside cylindrical cathode compartment, inside the tube 20, and an outside annular anode compartment, between the tube 20 and the casing 12. The tube 40 in turn divides the cathode compartment into a gas chamber defined by the interior of the tube 40 and of the spigot 32, and a cathode chamber defined by the interior of the tube 20 outside the tube 40; and the casing 64 divides the anode compartment into a gas chamber between said casing 64 and the casing 12, and an anode chamber between said casing 64 and the tube 20.

In use, to assemble the cell, the cathode matrix is conveniently vacuum impregnated with liquid electrolyte in situ, via the tube 74, or it can be pre-impregnated externally before loading into the housing. The interior of the tube 20 can then be filled with an inert gas such as argon or nitrogen and then charged with molten liquid electrolyte. Preferably the cathode will be in an overdischarged state and sufficient electrolyte will be fed into the tube 20 to fill the tube 20 outside the tube 40 and partly fill the tube 40 (the housing 10 being in its upright operative condition or attitude as shown in the drawing), the gas in the tube 40 being under pressure and the capacity or volume of the active cathode substance and electrolyte being sufficient so that when the cell is fully charged there is still some electrolyte in the lower end of the tube 40. Instead, liquid electrolyte can be introduced into the tube 20 in particulate solid form to fill the tube 20 outside the tube 40 and partly fill the tube 40, after which it is melted in situ when the cell is raised to its operating temperature. This will automatically pressurize the inert gas inside the tube 40 and any inert gas outside the tube 40 can be bled from the tube 20 via the tube 74 when the cell has reached its operating temperature.

The housing 12 outside the tube 20 can be filled with inert gas via the tube 80 and a starting amount of particulate or solid sodium charged into the casing 12 via the tube 80, sufficient, when molten, to connect the lower end of the tube 20 electronically with the casing 64 and/or panel 66. Instead, a small graphite felt or metal gauze (not shown) can be located in the anode compartment, e.g. between and electronically interconnecting the tube 20 and panel 66.

If the cell is taken, at its operating temperature, from its overdischarged state to its discharged state, sodium ions will move from the liquid electrolyte into the internal crystal structure of the separator tube 20 and sodium metal will pass from the outside surface of said tube 20 into the anode compartment. When the discharged state is reached inert gas in the space between the tube 20 and the casing 64 can, if desired, be bled from this space via the passage 80, after which the tube is closed. The capacity of the cathode will be selected, together with the volumes of the spaces respectively between the casing 12 and casing 64 and between the casing 64 and tube 20, so that when the cell is in its discharged state there is enough sodium in the anode compartment completely to fill the space between the tube 20 and casing 64, and partly to fill the space between the casing 64 and casing 12, the inert gas remaining between the casings 12 and 64 being under pressure. Likewise, the volume of the cathode and the electrolyte used will be selected so that when the cell is fully charged the tube 20 outside the tube 40 will still be completely full of electrolyte and the tube 40 will contain some electrolyte and inert gas under pressure.

After the initial bleeding of the anode chamber has taken place, the cell will be charged up to its charged state, more sodium passing through the tube 20 from the cathode compartment into the anode compartment, so that the level of electrolyte will drop in the cathode gas chamber formed by the tube 40, and the level of sodium will rise in the anode gas chamber between the casings 12 and 64. When the cell is fully charged, the anode chamber may again optionally be bled via the passage 80.

During the next discharge cycle of the cell, sodium will move through the separator tube 20 from the anode compartment into the cathode compartment. The level of sodium in the anode gas chamber between the casings 12 and 64 will drop while the sodium in the anode chamber between the tube 20 and casing 64 will remain at its full level, held there by inert gas pressure in the anode gas chamber. As sodium in ionic form enters the cathode chamber, liquid electrolyte level rises in the tube 80 and inert gas in the cathode gas chamber formed by the tube 40 and spigot 33 is pressurized. At the end of this discharge cycle any gas in the tube 20 outside the tube 40 is bled via the tube 74, electrolyte rising in the tube 20 outside the tube 40 under the influence of gas pressure in the tube 40 and spigot 32. Further gas bleedings via passage 80 and tube 74 can take place after subsequent charge and discharge cycles respectively, if desired.

An advantage of the invention is that a cell is provided wherein it is ensured that all states of charge and discharge, the surface of the separator exposed to the anode compartment and the surface of the separator exposed to the cathode compartment are both at all times fully wetted respectively by liquid sodium and liquid electrolyte. A further specific advantage, when the cathode is loaded in its overdischarged state, i.e. when it is an iron, nickel or iron/nickel matrix containing an excess of NaCl dispersed therein and the liquid electrolyte contains Al, e.g. in particulate form therein, is that the cell can be assembled without any necessity for handling metallic sodium, the cell constituents, particularly if the cathode is loaded cold and pre-impregnated with the electrolyte and the liquid electrolyte is loaded cold in particulate form, being entirely safe to handle. It is also unnecessary, as inert gas is used and the cathode matrix is pre-impregnated with liquid electrolyte externally, at any stage to evacuate the cell during loading.

Finally, it should be noted that the method described above for loading an inside-cathode cell is equally applicabble to an outside-cathode cell; wicking of the sodium is not needed as inert gas pressure in the anode gas chamber keeps sodium level up to the desired height at all times; and it should also be noted that in principle non-return valves can replace the closure screws 76 and 82.

In a refinement of the invention each electrode compartment is preferably pressurized to substantially above atmospheric pressure, e.g. to a pressure of about 3-6 atmospheres. This can be effected by loading a suitable amount of sodium azide into each electrode chamber, and heating the cell to a temperature, above 320° C. sufficient to decompose the sodium azide. Sodium azide is NaN₃ and decomposes in the temperature range 280°-320° C. according to the formula

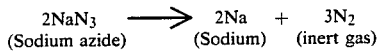
$$2NaN_3 \longrightarrow 2Na + 3N_2$$
(Sodium azide)    (Sodium)    (inert gas)

The sodium azide may be introduced into the cell wrapped in a suitable metal foil (eg nickel foil) compatible with the cell environment, in the form of a tablet containing inert binder, or the like. It is preferably located in position in each of the gas chambers above the maximum anticipated liquid levels in said gas chambers, e.g. as shown at 86 and 88 in the drawing. The sodium azide may be loaded into the cell at any convenient stage of loading the cell, e.g. before adding liquid electrolyte to the cathode compartment and before adding any sodium to the anode compartment.

When the cell is heated to its operating temperature, it can be heated to a temperature, e.g. slightly above 320° C., sufficient to decompose the sodium azide. This causes release of nitrogen (inert gas) which will pressurise the electrode compartments to a substantially greater degree than mere heating to the normal operating temperature.

Loading the cell will otherwise be substantially as described above and the electrode chambers will be bled as described, although gas at a higher pressure will be released. Sufficient sodium azide will be loaded to obtain the desired pressures, and the sodium produced by the decomposition will cause no problems. The elevated pressures will ensure that both sides of the separator are fully wetted at all times by forcing liquid under pressure into the electrode chambers.

We claim:

1. A rechargeable high temperature electrochemical power storage cell which comprises a cell housing divided by a separator into a pair of electrode compartments, one of which contains an anode substance and the other of which contains an active cathode substance and an electrolyte, said anode substance and electrolyte being liquid at the operating temperature of the cell, the separator separating the anode substance from the electrolyte and permitting the anode substance to pass from the anode compartment into the cathode compartment in ionic form, each of the compartments being divided into two communicating chambers, namely a gas chamber which contains an inert gas and an electrode chamber which contains a liquid at the operating temperature of the cell, a wall of each electrode chamber being provided by the separator and each electrode chamber having a closable outlet to the exterior of the cell, the cell having an operative attitude in which each closable outlet emerges from the associated electrode chamber at a level which permits any gas under pressure above a liquid in said chamber to be bled from said chamber, and in which operative attitude the communication between each electrode chamber and the associated gas chamber is at a level spaced below the top of said associated gas chamber, the cell in all states of charge in said attitude and at its operating temperature containing sufficient liquid in each divided electrode compartment fully to wet the adjacent side of that part of the separator which separates the electrode compartments from each other, each gas chamber in all states of charge of the cell and at said operating temperature containing, in addition to the inert gas, liquid above the level of its communication with the associated electrode chamber and containing said inert gas at a pressure and in a volume sufficient to accommodate changes in level of liquid in each divided electrode compartment associated with charging and discharging the cell.

2. A cell as claimed in claim 1 which has a base for supporting the cell in said operative attitude on a flat horizontal support surface.

3. A cell as claimed in claim 2, in which the separator is a straight tube having an open end and a closed end, the cell having a sealed outer casing surrounding the tube and spaced therefrom to provide a space between the tube and the casing which defines one of the electrode compartments, the open end of the tube having a sealed closure and the interior of the tube defining the other of the electrode compartments, and the tube and casing being arranged so that in the operative attitude of the cell the tube extends substantially vertically with its closed end lowermost.

4. A cell as claimed in claim 3, in which the electrode compartment defined by the interior of the tube has a tubular partition extending along its interior, the tubular partition having one end thereof sealed to the sealed closure of the tube and its other end open and spaced from and facing the closed end of the tube, the interior of the partition defining the gas chamber of said electrode compartment, the interior of the tube outside the partition defining the electrode chamber of said compartment, said chambers communicating via the open end of the partition and the closable outlet for the electrode chamber being provided in the tube closure.

5. A cell as claimed in claim 3, in which the electrode compartment defined by the space between the tube and the casing has a tubular partition extending along its interior and spaced from both the casing and the tube, the tubular partition having its end closest to the open end of the tube sealed to the casing and its other end open, the space between the tubular partition and the tube defining the electrode chamber of said compartment, and the space between the tubular partition and the casing defining the gas chamber of said electrode compartment.

6. A cell as claimed in claim 1, in which the anode substance is an alkali metal, the electrolyte is a metal halide, and the separator is a solid conductor of the alkali metal ions of the anode or a micromolecular sieve which contains the alkali metal of the anode sorbed therein.

7. A cell as claimed in claim 6, in which the alkali metal of the anode is sodium, the electrolyte is a sodium aluminum halide, the separator is beta″-alumina, and the active cathode substance comprises at least one transition metal selected from the group comprising Fe, Ni, Co, Cr and Mn.

8. A cell as claimed in claim 7, in which the cathode is in the form of a porous matrix impregnated with the electrolyte, the molar proportion of alkali metal cations in the electrolyte being, at all stages of charge of the cell, no less than the molar proportion of aluminum cations therein

* * * * *